Figure 1:
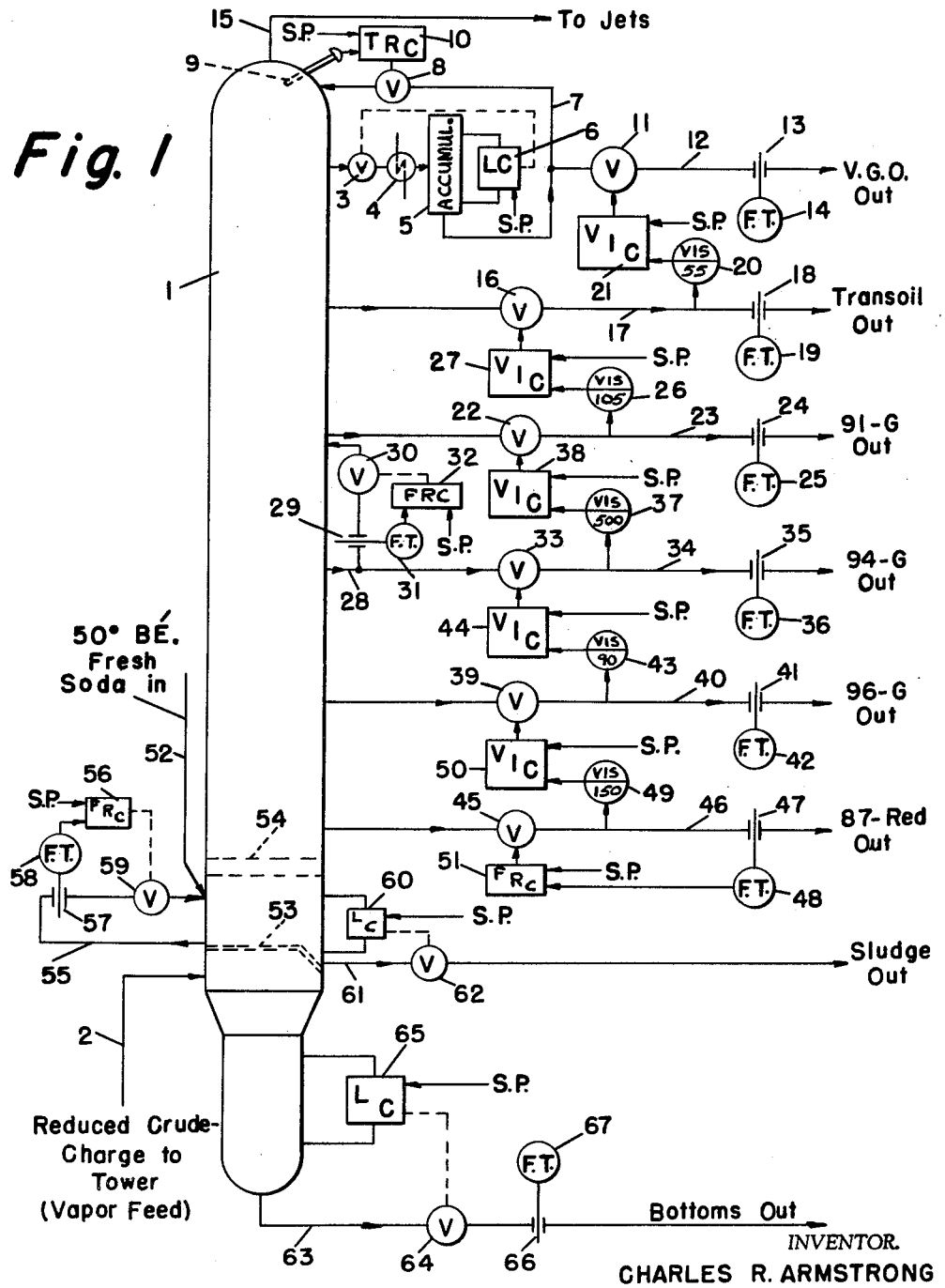

INVENTOR.
CHARLES R. ARMSTRONG
BY
*George L. Church*
ATTORNEY

May 18, 1965

C. R. ARMSTRONG 3,184,396

VISCOSITY ANALYZER CONTROL SYSTEMS

Filed Oct. 30, 1961

3 Sheets-Sheet 3

INVENTOR
CHARLES R. ARMSTRONG
BY George L. Church
ATTORNEY

United States Patent Office 3,184,396
Patented May 18, 1965

3,184,396
VISCOSITY ANALYZER CONTROL SYSTEMS
Charles R. Armstrong, Broomall, Pa., assignor to Sun Oil Company, Philadelphia, Pa., a corporation of New Jersey
Filed Oct. 30, 1961, Ser. No. 148,660
12 Claims. (Cl. 196—132)

This invention relates to control systems for a process, and more particularly to control systems for a petroleum refinery fractionation (vacuum distillation) tower. By way of example, the invention will be described in connection with a tower for fractionation of a crude oil charge into naphthenic lubricating oil products. However, it is pointed out that the control systems of the invention may be utilized to control other processes.

An object of this invention is to provide control systems for a tower which will automatically maintain a plurality of products derived from the tower accurately on their proper viscosity specifications, regardless of operational disturbances such as power failures, changes in crude feed stock, rain storms, etc.

Another object is to provide control systems for a tower which will operate to increase the yield of useful products from the tower.

A further object is to provide control systems for a tower which will enable easy variation of the rate of flow of one or more particular products from the tower, as called for by changing sales, while maintaining all products on their proper viscosity specifications.

A still further object is to provide novel automatic control systems for a fractionation tower.

The objects of this invention are accomplished, briefly, in the following manner. A fractionation tower (vacuum distillation tower) is fed with a charge stock consisting of so-called "reduced" crude oil, and from this tower are taken one overhead stream and a plurality (five, by way of example) of side streams, as well as a sludge stream and a bottoms stream. A set of five viscometers, each paired with a respective viscosity indicating controller, are utilized. Each one of the viscometers is coupled to measure the viscosity of a respective one of the side streams, and each viscometer-controller combination is manually settable to develop a mean output signal in response to a predetermined, desired viscosity of the corresponding side stream. Variations of the side stream viscosities from their predetermined, desired values result in variations of the output signals of the corresponding viscometer-controller combinations. The output of each controller is a pneumatic signal, and the output signal of each controller is applied to a draw-off valve in the next adjacent stream above. That is, the viscosity of a given side stream (which is measured by a corresponding viscometer) is regulated by changing the draw-off rate of the adjacent stream next above this given stream, the viscosity of the uppermost side stream being regulated by changing the draw-off rate of the overhead stream.

In a modified system, an analog computer is used, to automatically control the output of within specification products (lubricating coils) according to the composition (content) of the crude feed stock. The computer receives viscosity input information from the viscosity indicating controllers, and also flow input information which is fed thereto manually; the computer outputs control the flow valve (draw-off valves) for the products from the tower, according to viscosity specifications.

Figure 2:
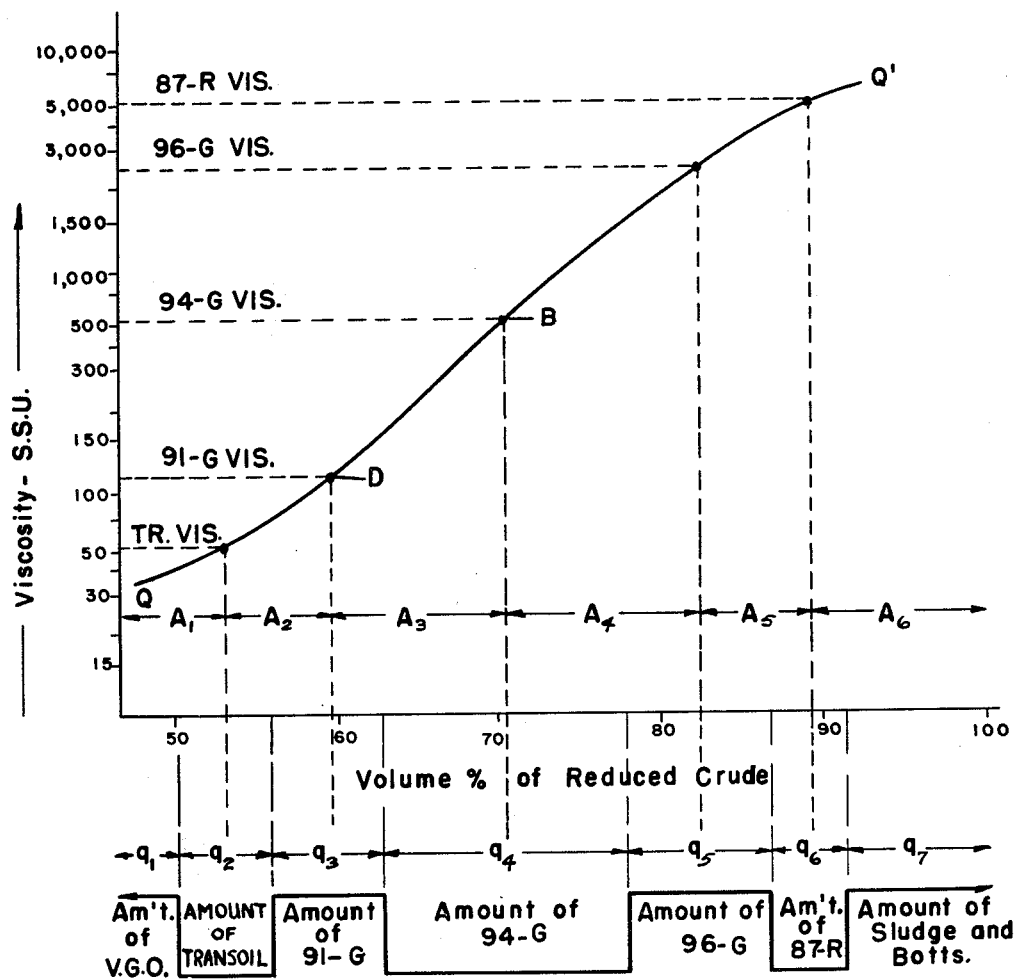
Figure 3:
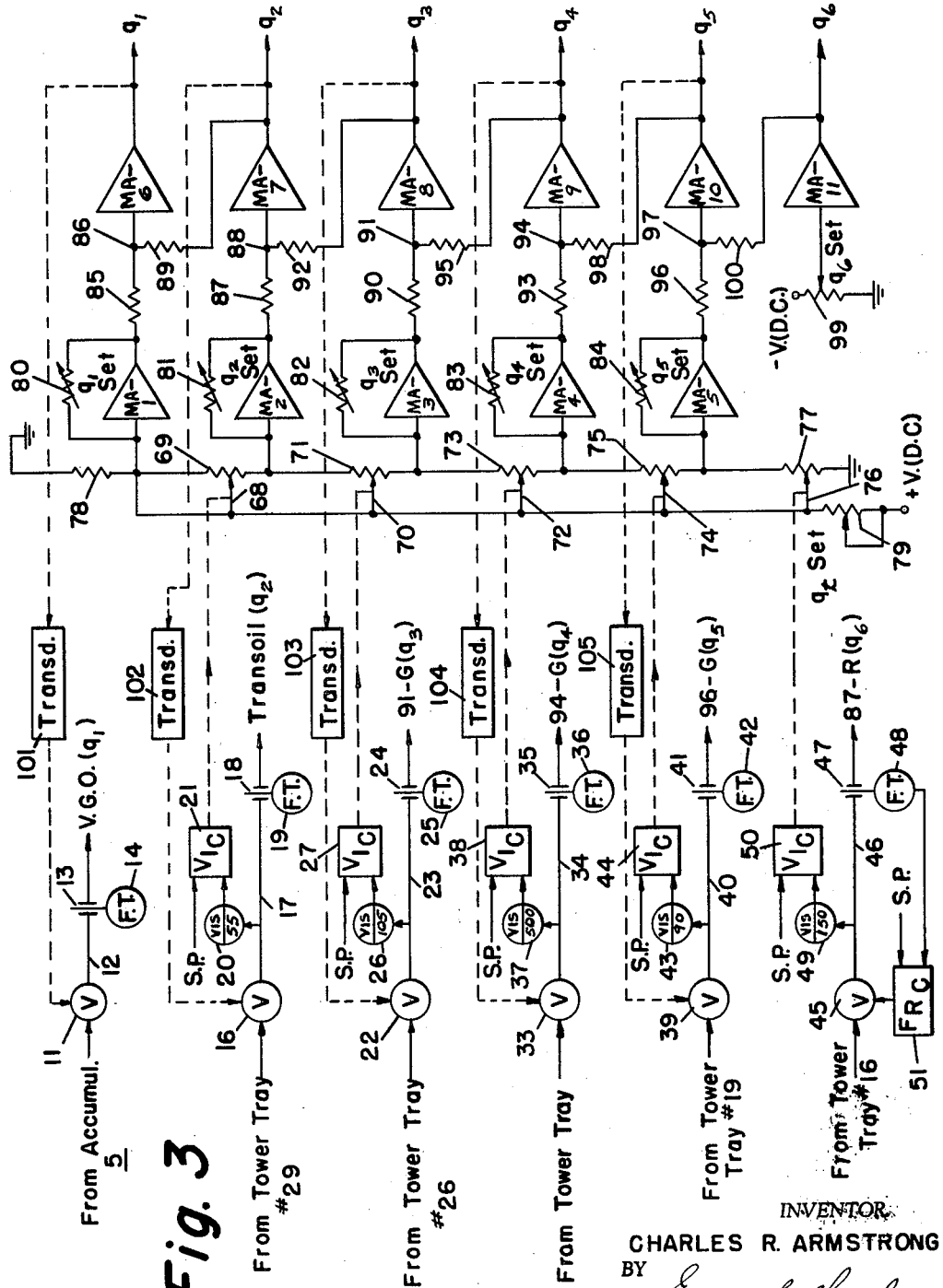

A detailed description of the invention follows, taken in conjunction with the accompanying drawings, wherein:

FIG. 1 is a diagrammatic illustration of a control system according to the invention;
FIG. 2 is a graph useful in explaining the invention; and
FIG. 3 is a diagrammatic illustration of a modified control system.

Refer first to FIG. 1. The charge or feed to the vacuum tower 1 illustrated by way of example is always wax-free naphthenic crude, segregated and blended to produce lubricating oils with a viscosity-gravity-constant of 0.885 to 0.893. Such a crude is termed "reduced" because the lower-boiling components (e.g., straight-run gasoline, naphtha, etc.) have previously been stripped therefrom, in a separate crude tower (not shown). The tower 1 employs the vapor-phase caustic treating process, and operation of the vacuum tower determines directly the yield and quality of the lubricating oil products made therein. Speaking generally, the vapor-phase caustic distillation process is a conversion-separation which uses a chemical, caustic soda, to convert acidic constituents of a hydrocarbon vapor into a non-volatile sodium salt, thus separating them from the vapor. The vacuum tower may have thirty-nine trays, and may be twenty feet in diameter, with a height of one hundred twenty-eight feet. It has a throughput capacity of 12,000 barrels per day. It has one overhead gas oil stream (denoted by "V.G.O.," for "vacuum gas oil") and five lubricating-oil product side streams. These latter streams are denoted, in order downwardly from the overhead stream, by "transoil" (for transformer oil), "91–G" (for an oil designated "91 Golden"), "94–G" (for "94 Golden"), and "87–Red." The caustic sludge produced in the tower as a result of the caustic treating process is taken off via a connection labeled "Sludge," while the tower bottoms is taken off via an appropriately-labeled connection.

The vacuum on the top of the tower 1 is 15–20 mm. of Hg absolute, and is maintained by a set of barometric condensers and steam jet evacuators (not shown).

Variables that influence product yields and qualities from the tower 1 are the tower feed rate and its quality, tower temperatures and pressures, and draw-off rates of the overhead stream and the side streams. The correct draw-off rate is determined by measuring the viscosity of each product.

Prior to this invention, the tower operator would send a sample of each product stream to the refinery testing laboratory for a viscosity test. Later, when results of these tests were made known to the operator, he would correct the product to the viscosity specification by manually adjusting the side stream (or overhead stream) draw-off rates. When more than two such adjustments were required, the operator found himself "hard pressed" to keep his system in balance. Since an adjustment of any side stream will affect adjacent streams, the choice of which stream to adjust became annoying. For the case of two adjustments (increased or decreased drawoff) on six streams (five side streams plus the overhead stream), there are fifteen possibilities.

In addition to this, sometimes adjustments were inadvertently imposed on the tower, in the form of a cooling rain shower striking the outside of the tower, a power outage, or a change of crude feed stock, at which times it took the operator several hours, or even days, to return the tower to normal, proper operation.

It should therefore be apparent that some form of automatic system for controlling lubricating oil manufacture is desirable. One form of control system is disclosed in FIG. 1. The "reduced" crude is charged or fed to the vacuum distillation or fractionation tower 1 near the bottom thereof, by means of a pipe connection 2, somewhat schematically illustrated. The temperature of this feed is about 650° F., so the feed is in the vapor phase.

An overhead stream of a fluid termed "Vacuum Gas Oil" is taken off through a controlled draw-off valve 3 from a point near the top of tower 1 (e.g., at tray #35 counting from the bottom of the tower, the tower having thirty-nine trays), this fluid being condensed in a condenser 4 (indicated in FIG. 1 by a conventional schematic symbol) and then fed into an accumulator 5. A level controller 6 (indicated by the label "LC," the controller having an adjustable set point as indicated at "S.P.") is responsive to the level of liquid in accumulator 5, and controls or operates valve 3 in such a way that when the liquid in the accumulator falls to a predetermined lower level the valve 3 is opened wider but when the accumulator liquid rises to a predetermined upper level the valve 3 is actuated toward its closed position. Thus, a substantially constant liquid level is maintained in accumulator 5. The operative connection between controller 6 and valve 3 is indicated in dotted lines in FIG. 1.

A portion of the "VGO" stream is caused to return to the top of the tower as reflux, in order to maintain the overhead temperature in the tower approximately constant. For this purpose, a connection 7 leads off from the bottom of accumulator 5 and extends into the top of the tower (above the point of draw-off of the "VGO" stream) by way of a controlled valve 8. A temperature-sensing element (thermocouple) 9 is mounted in the top of tower 1 and feeds its signal into a temperature recording controller 10 (indicated by the legend "TRC") which has a set point adjustment indicated by the legend "S.P." Controller 10 controls or operates the valve 8 to keep the temperature at the top of the tower approximately at the set point of the controller, by controlling the amount of vacuum gas oil refluxed into the tower.

The use of the vacuum gas oil stream for reflux purposes takes precedence over any other use thereof. Vacuum gas oil accumulating in vessel 5, and not needed for reflux, may be taken off to storage through a controllable draw-off valve 11 (controlled in a manner to be described hereinafter) whose input side is connected to a line 12. A flowmeter 13 is connected into line 12, to measure the flow to storage of the overhead or vacuum gas oil, a flow transmitter 14 (indicated by the legend "F.T.") being connected to the flowmeter 13 to indicate the actual flow in line 12.

Vacuum on the top of the tower 1 is maintained at a value of 15–20 mm. of Hg absolute, by a set of barometric condensers and steam jet evacuators (not shown), which are connected at 15 to the top of the tower.

The first (or uppermost) oleaginous product side stream is taken off from tower 1 at tray #29 through a controllable draw-off valve 16 (controlled in a manner to be described hereinafter), this product flowing to storage by way of a line 17. This first oleaginous product is transformer oil stock, known as "Transoil." A flowmeter 18 is connected into line 17, to measure the flow to storage of the first lubricating oil product, a flow transmitter 19 being connected to the flowmeter 18 to indicate the actual flow in line 17.

Since the primary variable to be controlled, in the lubricating oil manufacturing process described, is viscosity, the vacuum tower 1 should be operated to meet the viscosity specifications on each of the side streams. A viscometer 20 continuously samples or measures the product flowing in line 17 and produces an output, in the form of a pneumatic signal, which is proportional to the viscosity of the sampled product stream. The viscometer 20 is adjusted to operate around a viscosity value of 55 S.S.U. at a reference temperature of 100° F.; hence, this viscometer is denoted by the legend "Vis 55" in FIG. 1. The viscometer 20 produces an output signal of a known, predetermined value when the viscosity of the product stream in line 17 is 55 S.S.U., the viscometer operating to produce output signals differing from the known value when the viscosity of the sample stream deviates from the 55-S.S.U. value.

There are many instruments, for continuously measuring viscosity, which can be used at 20. By way of example, one found suitable is the Hallikainen Continuous Indicating and Recording Viscometer. Results from this instrument agree to within 0.2 S.S.U. of laboratory tests on the lighter lubricating oils, and to within 2 S.S.U. of laboratory tests on the heavier lubricating oils.

The output signal of viscometer 20 is fed to a viscosity indicating controller 21, having a set point adjustment indicated by the legend "S.P." Controller 21 is simply a conventional transducer (utilizing a bellows construction by way of example) which converts the pneumatic signal output of viscometer 20 to one suitable for operating (positioning) a control valve, or draw-off valve. Controller 21 produces a pneumatic output signal which can vary over a range of 3–15 p.s.i.g. (for example), in accordance with or under the control of the output of viscometer 20. The "set point" adjustment enables the output of controller 21 to be adjusted to some mean value (e.g., 9 p.s.i.g.) when the viscometer output signal is at its mean value (i.e., when the product being sampled thereby, which is the product in line 17, has a viscosity of exactly 55 S.S.U.). Since the output of controller 21 varies from its mean value (which may be thought of as a "zero value") when the output signal of viscometer 20 varies from its mean value (which latter variation results from a change in the viscosity of the "Transoil" from its assigned value of 55 S.S.U.), this variation of the controller output from its means value may be thought of as the production of an error signal, and the relative sense of this latter error signal corresponds to the direction of the change in the product viscosity from its assigned value. It will be remembered that the so-called "zero value" of the output of controller 21 is in fact a finite quantity other than zero, and may be, for example, 9 p.s.i.g.

It should be pointed out that, since the output signals of viscometer 20 and controller 21 are pneumatic signals whose pressures are responsive to the actions of these two units, a compressed air supply (not shown), such as a so-called "instrument air" supply of 20 p.s.i.g., would be connected to units 20 and 21.

According to this invention, the signal out of the controller 21, and the similar signals out of similar controllers (to be referred to hereinafter), are used to position control valves or draw-off valves, to regulate the draw-off rates of the vacuum tower side streams, and also of the overhead stream. The viscosity of each given side stream is regulated by changing the draw-off rate of the next adjacent stream above. Thus, the output signal from controller 21 (which, it will be recalled, depends upon the viscosity of the "Transoil" stream, line 17, as measured by viscometer 20) is applied to the pneumatically-actuated control valve 11, which is the draw-off valve in the overhead or "V.G.O." stream, line 12. As long as the viscosity of the stream in line 17 is at its assigned value of 55 S.S.U., the valve 11 will remain in a mean position, under the control of the mean (average) pneumatic signal (9 p.s.i.g., for example) applied to the valve from controller 21. If the viscosity of the "Transoil" stream increases, this change is detected by viscometer 20, resulting in a change in the signal output from controller 21, this changed controller output producing a movement of valve 11 toward its closed position; if the viscosity of the line 17 stream decreases, valve 11 is moved in the opposite direction from its mean position. A decrease in the rate of draw-off of the "V.G.O." stream (by movement of valve 11 toward its closed position) means that less of the lighter components are drawn off via line 12, forcing them down to line 17; this increase of the lighter components in line 17 brings the viscosity of the line 17 stream back down to its proper value. The opposite takes place when the valve 11 is moved in the direction of "open," from its mean position.

The second oleaginous product side stream is taken off from tower 1 at tray #26 through a controller draw-off valve 22, this product flowing to storage by way of a line 23. This second oleaginous product is a lubricating oil known as "91-Golden" (91–G). A flowmeter 24 is connected into line 23, to measure the flow to storage of the second product, a flow transmitter 25 being connected to the flowmeter 24 to indicate the actual flow in line 23.

A viscometer 26 continuously samples or measures the product flowing in line 23 and produces an output which is proportional to the viscosity of the sampled product stream. The viscometer 26 is adjusted to operate around a viscosity value of 105 S.S.U. at a reference temperature of 100° F., and is denoted by a corresponding legend in FIG. 1. Viscometer 26 may be of the same type as that at 20, previously described.

The output signal of viscometer 26 is fed to a viscosity indicating controller 27, having a set point adjustment indicated at "S.P." Controller 27 is of the same type as controller 21, previously described, and operates in a similar manner. Again, the viscosity of the line 23 stream is regulated by changing the draw-off rate of the next adjacent stream above. Thus, the output signal from controller 27 is applied to the pneumatically-actuated control valve 16, which is the draw-off valve in the "Transoil" stream, line 17. The action here is similar to that in the control loop 21, 11, etc. previously described. For example, if the viscosity of the "91–G" stream (line 23) decreases, this change is reflected in the signal output from controller 27, the changed controller output producing a movement of valve 16 toward its open position. An increase in the rate of draw-off of the "Transoil" stream (by movement of valve 16 toward its open position) means that more of the lighter components are drawn off via line 17, leaving less of these for line 23 and bringing the viscosity of the line 23 stream back up to its proper value.

The third oleaginous side stream is taken off from tower 1 via a connection 28, which is coupled to tower 1 below line 23. This third oleaginous product is a lubricating oil known as "94-Golden" (94–G). This last product flows through a heat exchanger (not shown) which has a controllable bypass therearound such as to provide, at the output side of the exchanger, fluid of a substantially constant temperature; this latter fluid is fed through a flowmeter 29 and through a control valve 30 back into the tower 1, as reflux, the feed back into the tower being above the draw-off point of connection 28 but below the draw-off point of line 23. The flowmeter 29 has connected thereto a flow transmitter 31 which feeds its signal into a flow recording controller 32 having a set point adjustment "S.P." Controller 32 controls or operates valve 30 to maintain the rate of "94–G" reflux substantially constant, and at the rate chosen by the operator (by adjustment of the set point of controller 32).

The "94–G" product not refluxed may be taken off to storage through a controllable draw-off valve 33 whose input side is connected to connection 28 and whose output side is connected to a line 34. A flowmeter 35 is connected into line 34, to measure the flow to storage of the third product, a flow transmitter 36 being connected to the flowmeter 35 to indicate the actual flow in line 34.

A viscometer 37 continuously samples or measures the product flowing in line 34 and produces an output which is proportional to the viscosity of the sampled product stream. The viscometer 37 is adjusted to operate around a viscosity value of 500 S.S.U. at a reference temperature of 100° F., and is denoted by a corresponding legend in FIG. 1. Viscometer 37 may be of the same type as that at 20, previously described.

The output signal of viscometer 37 is fed to a viscosity indicating controller 38, having a set point adjustment indicated at "S.P." Controller 38 is of the same type as controller 21, previously described, and operates in a similar manner. Again, the viscosity of the line 34 stream is regulated by changing the draw-off rate of the next adjacent stream above. Thus, the output signal from controller 38 is applied to the pneumatically-actuated control valve 22, which is the draw-off valve in the "91–G" stream, line 23. The action here is similar to that in the control loops 21, 11, etc. and 27, 16, etc. previously described.

The fourth oleaginous product side stream is taken off from tower 1 at tray #19 (below connection 28) through a controllable draw-off valve 39, this product flowing to storage by way of line 40. This fourth oleaginous product is a lubricating oil known as "96–Golden" (96–G). A flowmeter 41 is connected into line 40, to measure the flow to storage of the fourth product, a flow transmitter 42 being connected to the flowmeter 40 to indicate the actual flow in line 40.

A viscometer 43 continuously samples or measures the product flowing in line 40 and produces an output which is proportional to the viscosity of the sampled product stream. The viscometer 43 is adjusted to operate around a viscosity value of 90 at a reference temperature of 210° F., and is denoted by a corresponding legend in FIG. 1. Viscometer 43 may be of the same type as that at 20, previously described.

The output signal of viscometer 43 is fed to a viscosity indicating controller 44, having a set point adjustment indicated at "S.P." Controller 44 is of the same type as controller 21, previously described, and operates in a similar manner. Again, the viscosity of the line 40 stream is regulated by changing the draw-off rate of the next adjacent stream above. Thus, the output signal from controller 44 is applied to the pneumatically-actuated control valve 33, which is the draw-off valve in the "94–G" stream, line 34. The action here is similar to that in the control loops 21, 11, etc. and 27, 16, etc., previously described.

The fifth oleaginous product side stream is taken off from tower 1 at tray #16 through a controllable draw-off valve 45, this product flowing to storage by way of line 46. This fifth oleaginous product is a lubricating oil known as "87–Red." A flowmeter 47 is connected into line 46, to measure the flow to storage of the fifth product, a flow transmitter 48 being connected to the flowmeter 47 to indicate the actual flow in line 46.

A viscometer 49 continuously samples or measures the product flowing in line 46 and produces an output which is proportional to the viscosity of the sampled product stream. The viscometer 49 is adjusted to operate around a viscosity value of 150 at a reference temperature of 210° F., and is denoted by a corresponding legend in FIG. 1. Viscometer 49 may be of the same type as that at 20, previously described.

The output signal of viscometer 49 is fed to a viscosity indicating controller 50, having a set point adjustment indicated at "S.P." Controller 50 is of the same type as controller 21, previously described, and operates in a similar manner. Again, the viscosity of the line 46 stream is regulated by changing the draw-off rate of the next adjacent stream above. Thus, the output signal from controller 50 is applied to the pneumatically-actuated control valve 39, which is the draw-off valve in the "96–G" stream, line 40. The action here is similar to that in the control loops 21, 11, etc., and 27, 16, etc., previously described.

The draw-off of "87–Red" product, line 46, is controlled manually by the tower operator. Part of the "87–Red" content available in the crude or charge is allowed to remain in the tower, and is used to "thin" the sludge to prevent "plugging" the caustic section of the tower. The amount so used is at the discretion of the operator. The draw-off of "87–Red," and consequently the amount (measured by flow rate) of this product used to "thin" the sludge, is regulated by a flow recording controller 51, the draw-off regulation being effected by means of the set point adjustment "S.P." of this controller. The flow transmitter 48 feeds its signal into controller 51. Controller 51 controls or operates valve 45 to maintain the draw-off rate of "87–Red" substantially constant, and at the rate chosen by the operator (by adjustment of the set point of controller 51).

Fresh caustic soda, of concentration 50° Baumé, for example, is fed to tower 1 at tray #10, by means of a connection schematically indicated at 52. This feed is into the caustic section of the tower, which section is delimited by tray #7 (which is a so-called "total trap-out tray," as indicated at 53) and by a demister 54, both of conventional construction and operating in a conventional manner. Tray #7 is so constructed that no liquid from the upper portion of the tower can pass thereby or therethrough. It is pointed out that the tower feed or charge point (of connection 2) is located below tray #7. As previously stated, the caustic soda converts acidic constituents of the (crude) hydrocarbon vapor feed into a nonvolatile sodium salt, which collects in the form of a sludge on tray #7. Due to a limited rate of draw-off of "87–Red" product, some of this lubricating oil product remains in the tower, so that the aforementioned sludge has mixed therewith some of this oil. This oil "thins" the sludge to prevent "plugging" the caustic section of the tower 1, as previously stated. This oil leaves the tower along with the sludge, but is later recovered therefrom.

In order to provide a "stirring" of the sludge, some of the sludge (whose amount is under the control of the operator) is taken off from tray #7, by means of a connection 55. The amount (flow rate) of sludge taken off is regulated by a flow recording controller 56, the take-off regulation being effected by means of the set point adjustment "S.P." of this controller. A flowmeter 57 is connected into line 55 to measure the flow therein, a flow transmitter 58 being connected to the flowmeter 57 to indicate the actual flow in line 55. A controllable valve 59 is also connected into line 55. The transmitter 58 feeds its signal into controller 56. Controller 56 controls or operates valve 59 to maintain the take-off rate of the sludge (i.e., the flow rate of the sludge in line 55) substantially constant, and at the rate chosen by the operator (by adjustment of the set point of controller 56). Beyond valve 59, line 55 leads back into the tower, at tray #10, below demister 54. The take-off of sludge from tray #7, and the reinjection thereof into the tower at tray #10 (spaced above tray #7), produces a "stirring" effect on the sludge.

A level controller 60 (having an adjustable set point as indicated at "S.P.") is responsive to the level of sludge in the caustic section of the tower 1. Sludge is drawn off to storage from tower 1 by means of a line 61 which is coupled to the tower at tray 53, a controllable draw-off valve 62 being inserted in this line. Controller 60 controls or operates valve 62 in such a way that when the sludge in the tower rises to a predetermined upper level the valve 62 is opened wider but when the sludge falls to a predetermined lower level the valve 62 is actuated toward its closed position. Thus, a substantially constant sludge level is maintained in the caustic section of the tower.

Unvaporized or liquid components present in the crude charge or feed to tower 1 find their way down to the bottom of the tower, from whence these "tower bottoms" are drawn off to storage by means of a line 63. A controllable draw-off valve 64 is inserted in line 63. A level controller 65 (having an adjustable set point as indicated at "S.P.") is responsive to the level of bottoms in the lower part of the tower 1. Controller 65 controls or operates valve 64 in such a way that when the bottoms in the tower rises to a predetermined upper level the valve 64 is opened wider but when the bottoms falls to a predetermined lower level the valve 64 is actuated toward its closed position. Thus, a substantially constant bottoms level is maintained in the lower section of the tower.

A flowmeter 66 is connected into line 63, to measure the flow to storage of tower bottoms, a flow transmitter 67 being connected to the flowmeter 66 to indicate the actual flow in line 63.

In the system of FIG. 1, there are a plurality of control loops, one of which includes elements 20, 21, 11, etc. and another of which includes elements 26, 27, 16, etc. In this scheme, each control loop becomes an integral part of the whole control problem, since a change of flow on one stream will affect the two adjacent streams. This interdependence of control loops may be appreciated from a consideration of the following example. Let us suppose that the viscosity of the "94–G" stream, line 34, increases, say from 500 S.S.U. to 505 S.S.U. When this occurs, the output of controller 38 changes to cause draw-off valve 22 to move toward the closed position. This results, as previously explained, in bringing the viscosity of the line 34 stream back down to its correct value. The decrease of draw-off of "91–G," line 23 (as a result of valve 22 moving toward the closed position, as above) tends to increase the flows in the two adjacent streams, lines 17 and 34.

In connection with the foregoing, it is important to realize that the time constants encountered are large, since corrective measures must be reflected through the tower to be effective on the stream below.

With the system of FIG. 1, the viscometers permit only products that are on viscosity specification to go to storage. The last of the tower's feed is removed in the bottoms, the sludge, or the "V.G.O." stream, line 12. The chain of controllers must have a beginning; in FIG. 1, this is the set point of the controller 51 on the "87–Red" stream, line 46.

It may be seen that, with the system of FIG. 1, the only choice an operator has, when he wants to change the production of a side stream (product), is to change the viscosity set point of the next adjacent side stream below the one in question, by changing the set point of the viscosity indicating controller associated with the adjacent stream next below.

The foregoing naturally leads one into a realization of the existence of a classic problem, which is how to optimize production (in accordance with sales demand) and still meet the viscosity specifications of the products.

One way of solving the aforementioned problem might be to use flow controllers, in addition to the viscometer control loops, on each of the side streams, so that the operator could then increase or decrease the draw-off rates of the side streams (by adjustment of such flow controllers). In other words, this possibility will maintain viscosity specifications but change the rates of flow to storage. Such a system will work, but it will increase the number of decisions for an operator to make. In order to explain the action of this type of control system, we may utilize a graph of viscosity versus volume percent of reduced crude (feed to the tower), such as the one shown in FIG. 2.

If the curve constructed has the shape QQ', then viscosity values (ordinates) can be projected horizontally to intersect the curve at spaced points. These points of intersection can be called mid-points of given portions, or cuts, of crude. These cuts of crude are product quantities obtained from the tower as side streams, and are designated by $q_1$ through $q_7$. The sum of all the $q$'s is the total volume percent of reduced crude. The graph of FIG. 2 is typically representative of cuts within the limits of the content of crude available. If it be assumed that specification limits of viscosity are sufficiently broad for each product, then an approximate straight line relation between viscosity and percent volume of reduced crude exists over the comparatively narrow range between products. It then follows that equal volumes of products from either side of a specified viscosity value must be mixed, in order to produce within-specification products.

Keeping FIG. 2 in mind, if the operator decides to change a viscosity set point (in order to change the production of a side stream, for example), he must necessarily move the viscosity intercept to a point determined by projecting a horizontal line from the new ordinate (viscosity) value to curve QQ'. Now, to maintain equal volumes of products on both sides of the new viscosity intercept (so as to produce a within-specification product), there will need to be a redistribution of flows about the point in question. This change will "bump" the two adjacent streams, and they in turn will "bump" their neighbors until the new conditions are satisfied, thus causing a redistribution of draw-off rates on each of the side streams in the system. This redistribution will be brought about automatically with the control system of FIG. 1, whenever a viscosity set point is changed.

If, on the other hand (assuming that flow controllers are being used, in addition to the viscometer control loops), the operator decides to change the flow rate of a side stream and not change the viscosity intercept, he must change the rates of flow of the side streams on either side of the stream in question, in order to maintain equal volumes of products on both sides of the specified viscosity values. These changes will in turn "bump" their neighbors, forcing the operator to readjust more flow rates until the new conditions are satisfied.

With this last method of control (to wit, when using flow controllers, in addition to the viscometer control loops, on each of the side streams), the operator would be hard pressed to meet the prime objective of minimizing the quantity of lubricating oils lost to the overhead and bottom streams from the vacuum tower 1.

A better method of control would be to use an analog computer to continuously measure the input to the system, and to control the output of within-specification oils according to the available content of the crude. The computer arrangement to be presently described provides a supervisory control system which: (1) distributes product stream flows in accordance with the viscosity specifications; (2) allows an increase or reduction in the rate of draw-off of a particular side stream, within the limits of the available content of the crude, and concurrently maintains viscosity specifications automatically; (3) minimizes the quantity of lubricating oil lost to the bottoms and overhead streams from the tower for any one solution; and (4) relieves the operator of tedious flow and balancing-out adjustments on the process.

In order to accomplish the objectives listed in the preceding paragraph, use is made of the direct relationship between the quantity of product available in the crude and the viscosity of the product. Referring again to FIG. 2, the curve QQ' has been drawn as the best-fit along plotted points. For practical purposes, the segments between viscosity intercepts are considered as straight lines. The $q$'s have previously been defined as product quantities, e.g. $q_4$ is the amount of "94-Golden" oil available within the limits of the crude content. For ease of explanation, FIG. 2 shows that $q_4$ extends equal distances up and down the curve QQ' on either side of the "94-G" viscosity intercept B. The same explanation applies to all the other $q$'s.

The A's (FIG. 2) are defined as quantities within the limits of the available content of the crude, and, as shown, are volume percentages of reduced crude between viscosity intercepts. Therefore, the total amount of any A is the sum of one-half the $q$'s which it encompasses, e.g., $A_3$ is the sum of one-half $q_3$ and one-half $q_4$. It is also all of the content of crude available between the specified viscosities of "91-Golden" oil (viscosity intercept D) and "94-Golden" oil (viscosity intercept B); it is called a "flow distribution factor," which is made up of a summation of adjacent products.

Mathematical expressions for each of the flow distribution factors, in terms of product quantities, can now be written as follows:

$$A_1 = C_1 q_1 + \tfrac{1}{2} q_2 \quad (1)$$
$$A_2 = \tfrac{1}{2} q_2 + \tfrac{1}{2} q_3 \quad (2)$$
$$A_3 = \tfrac{1}{2} q_3 + \tfrac{1}{2} q_4 \quad (3)$$
$$A_4 = \tfrac{1}{2} q_4 + \tfrac{1}{2} q_5 \quad (4)$$
$$A_5 = \tfrac{1}{2} q_5 + \tfrac{1}{2} q_6 \quad (5)$$

and $$A_6 = \tfrac{1}{2} q_6 + C_7 q_7 \quad (6)$$

The analog computer utilized in the present invention continuously solves the foregoing group of simultaneous equations. Speaking generally, the analog computer consists of operational amplifiers and associated components which can be interconnected to simulate various mathematical functions describing a process. In particular, it is programmed to accept measurements of several product stream viscosities from a fractionation tower and to solve the above simultaneous equations relating the quantities of products available for given viscosity specifications. The computer output maintains set product viscosities and allows accentuation of any one product stream within the limits of the total available product, by cotrolling individual and total product flow.

The constants $C_1$, of Equation 1, and $C_7$, of Equation 6, are determined from plant data. They are programmed in the computer as a fixed value for any one given set of conditions, and they can assume a new value when the set of conditions is changed. Stream analyzers (the viscometers described previously, in connection with FIG. 1), which continuously measure viscosity, transmit the values of viscosity to the computer. These signals then become the ordinate values of the viscosity intercepts on the curve of FIG. 2.

The $q$'s are discrete amounts for a given solution, and are determined as will now be explained. The product quantity $q_1$ refers to an overhead vapor, termed "V. G. O.", which is condensed and collected in the accumulator 5 (FIG. 1). The overhead temperature control 9, 10, etc. commands most of the condensate to return to the vacuum tower 1 as reflux. A level controller 6 allows the rest of the liquid to go to storage, the quantity $q_1$ actually drawn off to storage being under the control of draw-off valve 11, which is responsive to viscosity.

The product quantity $q_7$ refers to a heavy liquid that drops to the bottom of the tower, plus a sludge that is formed in the caustic section of the tower. Each is sent to storage by its own level control system, including controller 65 for the bottoms and controller 60 for the sludge.

The product quantity $q_6$ refers to a product, called "87-Red." Part of the crude content available as "87-Red" is used to "thin" the sludge, the amount used being at the discretion of the operator and being regulated by the flow controller 51 (FIG. 1).

The product quantities $q_2$, $q_3$, $q_4$, and $q_5$ are discrete amounts for a given solution of the above equations, apportioned by viscosity measurements. The measured values are the ordinate values of the viscosity intercepts on the curve QQ' of FIG. 2. If provisions are made to adjust the viscosity intercepts such as B and D, then the volumes represented by the $q$'s can be changed to meet operational demands. In the special cases of $q_2$ and $q_6$, by adjusting the corresponding viscosity intercepts it is possible to move out on the curve QQ' (that is, to increase these $q$'s) and still meet the viscosity specifications for the remainder of the products.

Refer now to FIG. 3, which is a diagrammatic illustration of a control system employing an analog computer. The pneumatic outputs of the various viscosity indicating controllers are applied to respective air/current transducer potentiometers, which convert the pneumatic signals to corresponding mechanical positions of potentiometer shafts. Thus, the output of viscosity indicating controller 21 governs the position of the movable arm 68 of an air/current transducer potentiometer 69 which is connected between the amplifiers MA-1 and MA-2, on the input sides thereof. Similarly, the output of viscosity indicating controller 27 governs the position of the movable arm 70 of an air/current transducer potentiometer 71 which is connected between the amplifiers MA-2 and MA-3, on the input sides thereof. Also, the output of viscosity indicating controller 38 governs the position of the movable arm 72 of an air/current transducer potentiometer 73 which is connected between the amplifiers MA-3 and MA-4, on the input sides thereof. Likewise, the output of viscosity indicating controller 44 governs the position of a movable arm 74 of an air/current transducer potentiometer 75 which is connected between the amplifiers MA-4 and MA-5, on the input sides thereof. Finally, the output of viscosity indicating controller 50 governs the position of a movable arm 76 of an air/current transducer potentiometer 77 which is connected from the input of amplifier MA-5 to ground. A fixed resistor 78 is connected from the input of amplifier MA-1 to ground, at the upper end of the string or series of transducer potentiometers.

In order to energize the potentiometers, the ungrounded end of resistor 78, and the movable arms 68, 70, 72, 74, and 76 are all connected together and through a variable resistance (illustrated as a potentiometric resistance) 79 to the positive terminal of a unidirectional power supply.

The gain of each of the amplifiers MA-1 through MA-5 is adjustable, as by means of a feedback control potentiometer individual to each amplifier. Thus, amplifier MA-1 is provided with a feedback gain control potentiometer 80 schematically illustrated as connected between its input and output. Amplifiers MA-2, MA-3, MA-4, and MA-5 have respective feedback gain control potentiometers 81, 82, 83, and 84 connected in similar fashion.

The output of amplifier MA-1 is coupled through a resistor 85 to a point 86, which is at the input of amplifier MA-6. The output of amplifier MA-2 is coupled through a resistor 87 to a point 88, which is at the input of amplifier MA-7. A portion of the output of amplifier MA-7 is fed through a resistor 89 to point 86.

The output of amplifier MA-3 is coupled through a resistor 90 to a point 91, which is at the input of amplifier MA-8. A portion of the output of amplifier MA-8 is fed through a resistor 92 to point 88.

The output of amplifier MA-4 is coupled through a resistor 93 to a point 94, which is at the input of amplifier MA-9. A portion of the output of amplifier MA-9 is fed through a resistor 95 to point 91.

The output of amplifier MA-5 is coupled through a resistor 96 to a point 97, which is at the input of amplifier MA-10. A portion of the output of amplifier MA-10 is fed through a resistor 98 to point 94.

A manually-adjustable input potentiometer 99 is connected from the negative terminal of a unidirectional power supply to ground, and the movable arm of this potentiometer is coupled to the input of an amplifier MA-11. A portion of the output of amplifier MA-11 is fed through a resistor 100 to point 97.

The computer, working in conjunction with the viscometers (and the viscosity indicating controllers) can determine the amounts of $q_2$, $q_3$, $q_4$, $q_5$, and $q_6$ needed to maintain viscosity specifications on the system. It can do this after the operator tells it how much "87-Red" he needs to maintain sludge flowing. That is to say, the flow of the "87-R" product stream ($q_6$) is set manually on potentiometer 99 (in accordance with a given viscosity set point) and is used as the computer reference. After the operator, by adjustment of the set point of controller 51 on the "87-R" stream, sets the amount of this product which is left in the tower to "thin" the sludge, the flow to storage of this product is indicated on flow transmitter 48 as $q_6$, and this amount is set manually on potentiomter 99. As the $q_6$ stream flow is set, the computer will automatically adjust all the other flows.

If the computer has a knowledge of $q_1$, $q_7$, and the amount $q_T$ of reduced crude charged to the tower, it can maintain a material balance on the system. The charge rate $q_T$ to the tower is measured by means of a flowmeter (not shown) in feed line 2 (FIG. 1), and this rate is manually fed into the computer by adjustment of variable resistance 79. The product quantity $q_7$ (bottoms plus sludge) is determined by summing up the quantities $q_1$ through $q_6$ (each of which is measured by its own flowmeter) and subtracting the total from $q_T$, the total feed to the tower. This factor $q_7$ is put into the computer by means of fixed resistors which are connected into the circuit.

The chores of maintaining a material balance, and of maintaining the viscosity specifications on the system, are done continuously and automatically by the computer, sparing the operator many of the tedious flow and balancing-out adjustments on the system.

The feed flow to the tower is represented by a current $q_T$, which is manually varied (at 79) to compensate for any variations in feed. This current is divided (flow distribution factors) by combinations of transducer potentiometers (such as 69, 71, etc., which are automatically adjusted in accordance with the measured viscosities of the various streams) and fixed precision resistors (not shown). The input current to the amplifier MA-1 is made to equal $A_1$ for a particular crude, with the viscosity transducer potentiometers set on the viscosity specification points. Similarly for amplifiers MA-2, MA-3, MA-4, MA5 and $A_2$, $A_3$, $A_4$, and $A_5$, respectively. The transducers 69, 71, 73, 75, and 77 are padded with fixed resistors so that the signal currents are divided equally when on specification.

The quantities of $A_1$ through $A_5$ are entered into the computer by adjusting the gain of amplifiers MA-1 through MA-5 with the controls 80 through 84. These controls may be thought of as product flow potentiometers. The various amplifiers are adjusted in gain to correspond with the various flows $q_1$ through $q_5$, as indicated by the flow transmitters 14, 19, 25, 36, and 42, respectively. Thus, the gain of amplifier MA-1 is adjusted at 80 to the flow $q_1$, as read on flow transmitter 14. The gain of amplifier MA-2 is adjusted at 81 to the flow $q_2$, as read on flow transmitter 19. The gain of amplifier MA-3 is adjusted at 82 to the flow $q_3$, as read on flow transmitter 25. The gain of amplifier MA-4 is adjusted at 83 to the flow $q_4$, as read on flow transmitter 36. Finally, the gain of amplifier MA-5 is adjusted at 84 to the flow $q_5$, as read on flow transmitter 42.

When the products are "on" viscosity specification, the outputs of the respective amplifiers MA-1 through MA-5 are the respective quantities $-2A_1$ through $-2A_5$. Each of these outputs is summed algebraically with a set positive quantity of current from the level below. This summation is performed by means of the resistors 85 and 89 for amplifier MA-1, resistors 87 and 92 for amplifier MA-2, etc. The algebraic sum of these quantities is amplified and inverted (by means of amplifiers MA-6 through MA-10) to give a positive quantity representative respectively of the quantities $q_1$ through $q_5$ of FIG. 2. Thus, at the point 86 there is produced the algebraic sum $-2A_1+q_2$, and this is amplified and inverted by amplifier MA-6 to give $q_1$. At the point 88 there is produced the algebraic sum $-2A_2+q_3$, which is inverted and amplified by amplifier MA-7 to give $q_2$. At the point 91 there is produced the algebraic sum $-2A_3+q_4$, which is amplified and inverted by amplifier MA-8 to give $q_3$. At the point 94 there is produced the algebraic sum $-2A_4+q_5$, which is inverted and amplified by amplifier MA-9 to give $q_4$. At the point 97 there is produced the algebraic sum $-2A_5+q_6$, which is amplified and inverted by amplifier MA-10 to give $q_5$. The aforementioned quantities (at the outputs of amplifiers MA-6 through MA-10) agree with Equations 1 through 5 above.

At the output of amplifier MA-11 there is produced $q_6$, since the quantity $q_6$ is fed into the input of this amplifier.

The output currents of amplifiers MA-6 through MA-10 are used to control the flows of the respective product streams. The output current $q_1$ of amplifier MA-6 is fed to a current/air transducer 101 which converts this electrical signal to a pneumatic signal, which latter is used to control (i.e., position) the draw-off valve 11 in the "V.G.O." line 12. The output current $q_2$ of amplifier MA-7 is fed to a current/air transducer 102 which converts this electrical signal to a pneumatic signal, which latter is used to control (i.e., position) the draw-off valve 16 in the "Transoil" line 17. The output current $q_3$ of amplifier MA-8 is fed to a current/air transducer 103 which converts this electrical signal to a pneumatic signal, which latter is used to control (i.e., position) the draw-off valve 22 in the "91-G" line 23. The output current $q_4$ of amplifier MA-9 is fed to a current/air transducer 104 which converts this electrical signal to a pneumatic signal, which latter is used to control (i.e., position) the draw-off valve 33 in the "94-G" line 34. The output current $q_5$ of amplifier MA-10 is fed to a current/air transducer 105 which converts this electrical signal to a pneumatic signal, which latter is used to control (i.e., position) the draw-off valve 39 in the "96-G" line 40.

It has previously been stated that when the products are "on" viscosity specification, the outputs of the amplifiers MA-1 through MA-5 are the respective quantities $-2A_1$ through $-2A_5$. These quantities, summed algebraically with a set quantity of current from the level below and amplified in the respective amplifiers MA-6 through MA-10, give control quantities $q_1$ through $q_5$ which, applied respectively to valves 11, 16, 22, 33, and 39 by way of the respective transducers 101 through 105, maintain these draw-off valves open to the proper extent. This proper extent is normally such as to maintain the products "on" viscosity specification.

When a product stream is "off" viscosity specification, the output of its corresponding viscosity indicating controller (i.e., the controller coupled to the viscometer which is sampling the stream in question) changes or deviates from its "normal" or "mean" value. Then, the respective adjustable-gain (MA-1 through MA-5) amplifier will produce an output other than $-2A$, which will provide an error signal through the respective summing (MA-6 through MA-10) amplifier and respective flow controller (draw-off valve) that will correct the error in product stream viscosity.

By way of example, suppose the viscosity of the $q_3$ ("91-G") stream decreases. Then, the output of controller 27 will change, and the viscosity transducer (air/current transducer) 71, whose potentiometric arm 70 is positioned in response to this controller output, will indicate this change by altering the current flow (input) to amplifiers MA-3 and MA-2. This in turn alters the positive quantities (outputs) of amplifiers MA-8, MA-7, and MA-6 (the alteration of the last of these being effected because of the connection including resistor 89). Thus, the flows of product streams $q_1$, $q_2$, and $q_3$ are alternately decreased and increased respectively (by means of draw-off valves 11, 16, and 22), to restore the viscosity of $q_3$ and maintain the viscosity of product streams $q_1$ and $q_2$. Thus, in general, if the viscosity of any stream varies, the flows of all the product streams above the stream in question will be altered.

A variation in feed flow rate (as made effective on the computer manually, at 79) will cause simultaneous changes in all of the product flows. The changes will be proportional to the rate of reduced crude fed or charged to the tower.

A change of a viscosity specification (as explained previously), or rate of draw-off for a given stream, will cause a redistribution of all the other product flows. Any of these changes, when directed as a readjustment on one stream, will "bump" all of the other conditions in the system. However, the "bumps" will be of a transient nature, during which time the controllers themselves will correct any misalignments between measured variables and controller set points, and return them to their original values.

A change in the type of crude-mix fed or charged to the tower necessarily entails a change in the content of the available crude, and thus a change in the shape of the "Viscosity-Volume Percent of Reduced Crude" curve, from the shape shown in FIG. 2. However, the viscosity ordinates (the horizontal lines in FIG. 2) remain fixed for each particular product, since these are established by the set points of the various controllers, which are suitably calibrated. Since under these conditions the FIG. 2 curve shifts while the ordinates remain fixed, it necessarily follows that the abscissae (the various product flows) must shift. That is to say, there must be a redistribution of the product flows to meet the viscosity specifications assigned to the system. This redistribution of the product flows is brought about by the computer, as a result of the changed outputs of the various viscocity indicating controllers 21, 27, etc., which controller outputs are fed into the computer as previously described.

A convenient arrangement for original adjustment of the computer, and for connecting the computer into the process, may be provided by employing a three-way air valve between each viscosity indicating controller and the draw-off valve associated therewith. With such an arrangement, the control system of FIG. 1, or the computer arrangement of FIG. 3, can be rendered effective at will. Each of these three-way valves would have two input connections and one output connection, with the output being connected respectively to each of the inputs in the two respective positions of the valve. The output connections of the three-way valves would be coupled respectively to the draw-off valves such as 16, 22, etc. One of the two input connections for each valve would be coupled to the air side of the respective computer-operated current/air transducers such as 102, 103, etc.; the other input connections for the valves would be coupled respectively to the viscosity indicating controllers such as 21, 27, etc. and also to the respective air/current transducers such as 69, 71, etc. Thus, in the "FIG. 1" position of the three-way valves, the pneumatic signals from the viscosity indicating controllers would be fed directly to the appropriate draw-off valves (and also to the appropriate air/current transducers), but the computer-operated current/air transducer outputs would be disconnected; in the "FIG. 3" position of the three-way valves, the pneumatic signals from the viscosity indicating controllers would be fed to the appropriate air/current transducers and the computer-operated current/air transducer outputs would be connected to the draw-off valves, but the direct connection from the viscosity indicating controllers to the draw-off valves would be broken.

Summarizing, the control system of FIG. 1 automatically controls the viscosities of the vacuum tower side streams, on an individual basis, by regulating flows to maintain viscosity specifications. In the control system of FIG. 3, the computer outputs control flow valves for the product distribution of lubricating oils from the tower, according to viscosity specifications.

The control systems of this invention offer many economic advantages. Blends are easy to make at the tower (e.g., by varying the set point of one or more of the viscosity controllers), thus saving tankage formerly used for mixing. Work in blending and transfer at the point of shipping are reduced. With the systems of this invention, the charge rate to the tower can be changed an amount of one thousand barrels per day in a time interval as short as one hour, whereas by prior techniques the same change could be made only in steps of one hundred barrels per shift.

Other direct economic advantages are realized, with this invention, by the reduction of laboratory viscosity testing of the vacuum tower side stream products. Also, actual operation of the control systems of the invention showed a substantial increase in lubricating oil yields, over the previous yields. In addition to the increased yields of lubricating oils, the product viscosity specifications are more uniformly controlled through automation.

The invention claimed is:

1. In a control system for a fractionation process, a fractionation tower, means for continuously feeding a charge into said tower, means for continuously drawing off, from respective spaced points in said tower, a plurality of separate product streams, an analog computer having an information input and a signal output; viscosity measuring means receptive of a portion of one of said product streams for producing a signal proportional to the viscosity of said one product stream, means for automatically feeding said last-mentioned signal into said information input, means for feeding into said information input a manually-adjustable voltage proportional to the charge rate into said tower, and means controlled by said signal output for automatically regulating the draw-off rate of the adjacent product stream next above said one product stream.

2. In a control system for a fractionation process, a fractionation tower, means for continuously feeding a charge into said tower, means for continuously drawing off, from respective spaced points in said tower, a plurality of separate product streams, an analog computer having an information input and a signal output; viscosity measuring means receptive of a portion of one of said product streams for producing a signal proportional to the viscosity of said one product stream, means for automatically feeding said last-mentioned signal into said information input, means for feeding into said information input a manually-adjustable voltage proportional to the charge rate into said tower, means for feeding into said computer a manually-adjustable voltage proportional to the flow rate to storage of one of said product streams, and means controlled by said signal output for automatically regulating the draw-off rate of the adjacent product stream next above said first-mentioned one product stream.

3. In a control system for a fractionation tower, means for continuously feeding a charge into said tower, means for continuously drawing off, from respective spaced points in said tower, a plurality of separate product streams, an analog computer having an information input and a signal output; viscosity measuring means receptive of a portion of one of said product streams for producing a signal proportional to the viscosity of said one product stream, means for automatically feeding said last-mentioned signal into said information input, means for feeding into said information input a voltage whose magnitude is manually adjusted for correlation with the charge rate into said tower, means for feeding into said computer a voltage whose magnitude is manually adjusted for correlation with the flow rate to storage of the lowermost product stream, and means controlled by said signal output for automatically regulating the draw-off rate of the adjacent product stream next above said one product stream.

4. In a control system for a fractionation process, a fractionation tower, means for continuously feeding a charge into said tower, means for continuously drawing off, from respective spaced points in said tower, a plurality of separate product streams, an analog computer having a plurality of information inputs and a plurality of signal outputs, the number of such inputs and the number of such outputs each being equal to the number of product streams less one; a plurality of viscosity measuring means each receptive of a portion of a corresponding one of said product streams for producing a respective signal proportional to the viscosity of the associated product stream, means for automatically feeding the last-mentioned signals each to a respective one of said information inputs, means for feeding into all of said information inputs a manually-adjustable voltage proportional to the charge rate into said tower, and means controlled by each of said signal outputs for automatically regulating the draw-off rate of a corresponding product stream.

5. In a control system for a fractionation process, a fractionation tower, means for continuously feeding a charge into said tower, means for continuously drawing off, from respective spaced points in said tower, a plurality of separate product streams, an analog computer having a plurality of information inputs and a plurality of signal outputs, the number of such inputs and the number of such outputs each being equal to the number of product streams less one; a plurality of viscosity measuring means each receptive of a portion of a corresponding one of said product streams for producing a respective signal proportional to the viscosity of the associated product stream, means for automatically feeding the last-mentioned signals each to a respective one of said information inputs, means for feeding into all of said information inputs a manually-adjustable voltage proportional to the charge rate into said tower, means for feeding into said computer a manually-adjustable voltage proportional to the flow rate to storage of one of said product streams, and means controlled by each of said signal outputs for automatically regulating the draw-off rate of a corresponding product stream.

6. A control system in accordance with claim 5, wherein the signals automatically fed into the computer information inputs are representative of the viscosities of all product streams save the uppermost.

7. A control system in accordance with claim 5, wherein the signal outputs are used to automatically regulate the draw-off rates of all product streams save the lowermost.

8. A control system in accordance with claim 5, wherein the manually-adjustable voltage fed into said computer is proportional to the flow rate to storage of the lowermost product stream.

9. In a control system for a fractionation process, a fractionation tower, means for continuously feeding a charge into said tower, means for continuously drawing off, from respective spaced points in said tower, a plurality of separate product streams, an analog computer having a plurality of information inputs and a plurality of signal outputs, the number of such inputs and the number of such outputs each being eqal to the number of product streams less one; a plurality of viscosity measuring means each receptive of a portion of a corresponding one of said product streams for producing a respective signal proportional to the viscosity of the associated product stream, each produced signal varying with respect to a mean value as the viscosity of the corresponding product stream varies with respect to a predetermined value; means for automatically feeding the last-mentioned signals each to a respective one of said information inputs, means for feeding into all of said information inputs a voltage whose magnitude is manually adjusted for correlation with the charge rate into said tower, means for feeding into said computer a voltage whose magnitude is manually adjusted for correlation with the flow rate to storage of one of said product streams, and means controlled by each of said signal outputs for automatically regulating the draw-off rate of a corresponding product stream.

10. A control system in accordance with claim 9, wherein the signals automatically fed into the computer information inputs are representative of the viscosities of all product streams save the uppermost.

11. A control system in accordance with claim 9, wherein the signal outputs are used to automatically regulate the draw-off rates of all product streams save the lowermost.

12. A control system in accordance with claim 9, wherein the voltage fed into said computer is proportional to the flow rate to storage of the lowermost product stream.

References Cited by the Examiner

UNITED STATES PATENTS

| | | | |
|---|---|---|---|
| 2,198,325 | 4/40 | Wynn et al. | 202—160 X |
| 2,252,550 | 8/41 | Bragg | 202—160 X |
| 2,893,927 | 7/59 | Mertz et al. | 202—160 |
| 2,977,289 | 3/61 | Kron | 202—160 X |
| 2,985,565 | 5/61 | Bellinger | 202—160 |
| 2,990,437 | 6/61 | Berger | 202—160 X |
| 3,025,232 | 3/62 | Jones | 196—132 |

OTHER REFERENCES

"Automatic Control," vol. 7–8, May 1958, pp. 43–48.
"Chemical Engineering," May 1952, pp. 164, 165.

NORMAN YUDKOFF, *Primary Examiner.*

ALPHONSO D. SULLIVAN, GEORGE D. MITCHELL,
*Examiners.*